(12) United States Patent
Jordil et al.

(10) Patent No.: US 8,701,298 B2
(45) Date of Patent: Apr. 22, 2014

(54) COORDINATE MEASURING MACHINE

(75) Inventors: Pascal Jordil, Ecoteaux (CH);
Benjamin Vullioud, Gollion (CH)

(73) Assignee: Tesa SA, Renens (CH)

( * ) Notice: Subject to any disclaimer, the term of this patent is extended or adjusted under 35 U.S.C. 154(b) by 194 days.

(21) Appl. No.: 13/485,265

(22) Filed: May 31, 2012

(65) Prior Publication Data

US 2013/0139397 A1 Jun. 6, 2013

(30) Foreign Application Priority Data

Jun. 1, 2011 (EP) .................................... 11168477

(51) Int. Cl.
*G01B 5/008* (2006.01)
(52) U.S. Cl.
CPC ..................................... *G01B 5/008* (2013.01)
USPC ............................................ 33/503; 702/168
(58) Field of Classification Search
CPC ........ G01B 5/008; G01B 5/012; G01B 21/04; G01B 21/042; G01B 7/28
USPC .............. 33/503, 556; 700/303; 702/155, 168
See application file for complete search history.

(56) References Cited

U.S. PATENT DOCUMENTS

| | | | |
|---|---|---|---|
| 8,516,710 B2 * | 8/2013 | Jordil ............................... | 33/503 |
| 2001/0008994 A1 * | 7/2001 | Omori et al. ..................... | 702/95 |
| 2003/0069709 A1 * | 4/2003 | Noda et al. ...................... | 702/104 |
| 2003/0106232 A1 * | 6/2003 | Jordil et al. ...................... | 33/832 |
| 2004/0103548 A1 * | 6/2004 | Jordil et al. ...................... | 33/504 |
| 2008/0257023 A1 * | 10/2008 | Jordil et al. ...................... | 73/105 |
| 2009/0000136 A1 | 1/2009 | Crampton | |
| 2011/0056085 A1 | 3/2011 | Jordil | |
| 2013/0006579 A1 * | 1/2013 | Sakurada et al. ............. | 702/168 |
| 2014/0025336 A1 * | 1/2014 | Noda et al. ..................... | 702/168 |

OTHER PUBLICATIONS

Extended European Search Report dated Aug. 1, 2012 as received in application No. 12 17 0446.4.

* cited by examiner

*Primary Examiner* — G. Bradley Bennett
(74) *Attorney, Agent, or Firm* — Maschoff Brennan

(57) ABSTRACT

Coordinate positioning machine or coordinate measuring machine (CMM), with a microprocessor control unit arranged to drive individual axis driver and a proxy module allowing the connection of external devices on a TCP/IP interface. The external devices are used for User interaction, by means of an http server embedded in the microprocessor control unit, or for advanced tasks including tuning and calibration of the dynamic parameters.

9 Claims, 4 Drawing Sheets

COORDINATE MEASURING MACHINE

REFERENCE DATA

The present application claims priority from European Patent Application EP11168477.5 filed on Jun. 1, 2011, the contents whereof are hereby incorporated by reference.

TECHNICAL FIELD

The present invention concerns an automated coordinate measuring machine (CMM) or a computer numerical control (CNC) machine equipped with a measuring probe and, in particular, a motorized coordinate measuring machine provided with a specialized measurement controller and affording greater flexibility in the management, programming and adaptation of the axes movements to take into account changes in the measuring system and of the probe.

STATE OF THE ART

It is well known how to use coordinate measuring machines (also called CMM) provided with mobile axes and with an orientable head at the end of which a probe makes it possible to measure the coordinates of the surface of a machined part or of any object, and to extract therefrom information from the measurement of the points to determine points, straights, surfaces and simple geometric shapes. One knows in particular coordinate measuring machines with a travelling bridge having three linear orthogonal axes, or also machines with an articulated arm with rotation axes only, wherein the measuring probe is fastened to the extremity of an articulated arm, or also machines combining linear axes and rotation axes. CMMs generally have encoders for determining the position of the measurement at a given instant along each independent axis and, by means of an appropriate calibration, for accurately obtaining the coordinates relative to each measured point.

The orientable head serves to direct the measuring probe in one direction in order to move the piece to be measured closer without causing any collision. The measuring probe can be a trigger feeler, with a stylus provided with a ruby sphere designed to touch the part to be measured, or also a touchless probe, for example an optical probe.

One can also distinguish between manual measuring machines, wherein the probe is moved manually by an operator, and motorized measuring machines capable of autonomous movements determined by the operator with an appropriate remote directional control, for example, or according to a predetermined program based on a model or a programming to perform successive approach movements to determine the dimensions with an edge detection system.

Motorized measuring machines are advantageously used for the dimensional control of a plurality of similar or nominally identical parts. They make it possible to achieve repeatable measurements without depending on the operator, but on the other hand they require a lot of time for developing the programs in automated measurement conditions. In this case, the measurement program is established beforehand and then executed in a manner that is always identical for each part. Generally, the CMM is controlled by a computer, for example a dedicated industrial PC, in which the measurement program is stored in the form of a sequence of operations comprising the paths that the measuring probe must travel in a given order and at a determined speed. Numeric controllers adapted to the machine and connected in known manner to the axes' motors and to the position encoders control the management of the axes' displacements.

Known measuring machines are controlled by systems combining several interconnected elements that are factory set. Furthermore, to limit dynamic influences, the systems are limited to work-parameters (for example: speed, acceleration etc.) much lower than what the machine can perform. Furthermore, these systems often have considerable space requirements and are more difficult to install, maintain and move with the machine and they increase the system's dimensions. These disadvantages are particularly severe for small and medium size systems and are not adapted to the dynamics of these types of machine.

BRIEF SUMMARY OF THE INVENTION

One aim of the present invention is to propose a measuring machine that is simpler and more compact than the known devices. The invention also enables the needs of the CMM as compared with the well-known CNC to be served by affording a better dynamic management of the regulation process of known devices.

According to the invention, these aims are achieved notably by means of the object of the main claim, whilst the dependent claims illustrate advantageous variant embodiments of the invention.

BRIEF DESCRIPTION OF THE FIGURES

Examples of embodiments of the invention are illustrated by the attached figures wherein.

EXAMPLE(S) OF EMBODIMENTS OF THE INVENTION

The following description and figures will refer, for concision's sake to an embodiment of the invention in a Coordinate measuring machine (CMM). It must be understood, however, that the invention is not so limited and is equally applicable to other kind of positioning machines and systems, like for example machine tools or robots, in which a measuring head or tool is connected to a movable controlled platform. Likewise, the following description relates to a machine and the relative motion controller with three linear axes and degrees of freedom, but this is not a limitation of the invention, the latter including positioning system with an arbitrary number of axes, linear or rotational.

Figure 1:
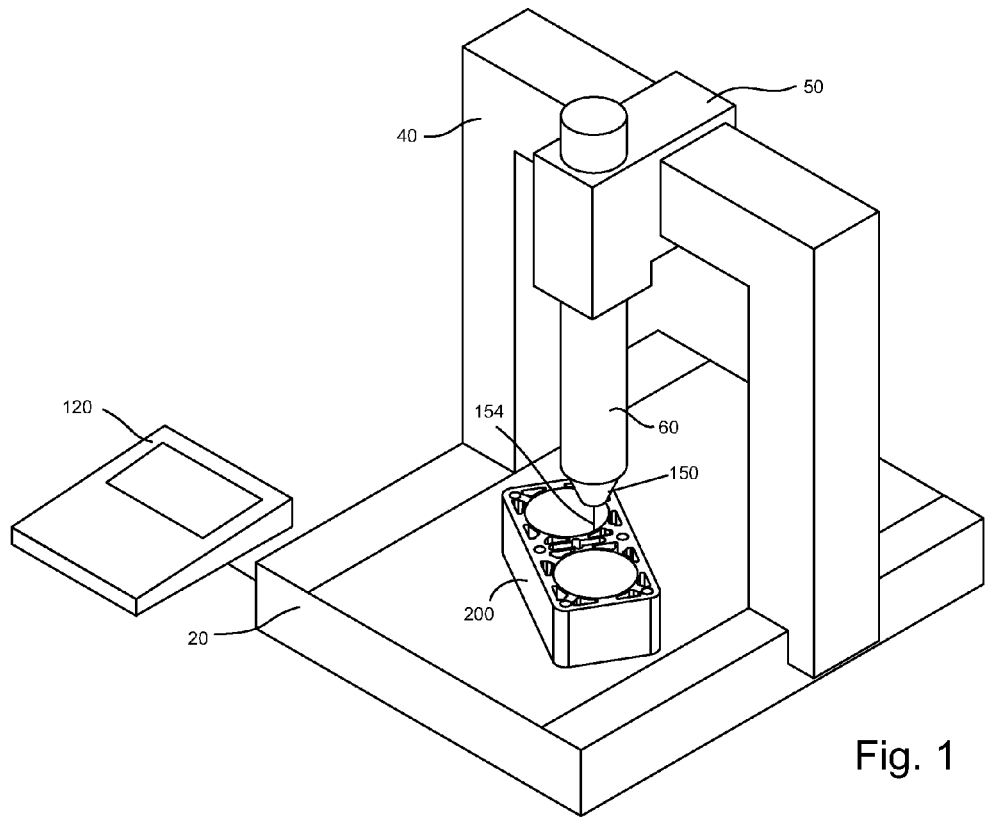
FIG. 1 illustrates diagrammatically a measuring machine with traveling bridge.

FIG. 1 represents a coordinate measuring machine of a conventional type, with a travelling bridge. A part to be measured is positioned on the table 20. The bridge 40 travels relative to the table 20 along a horizontal axis Y and the carriage 50 can slide on the cross slide of the bridge along a horizontal axis X, whilst the measuring head 60 can be moved along the vertical axis Z to position the measuring head and the probe so as to measure the part by means of the probe in any position in the three-dimensional measuring space of the CMM. The measuring head can be oriented and indexed to make it possible to orient the feeler in a direction adapted for the measurement.

The movements of the bridge 40, of the carriage 50 and the positioning of the measuring head 60 along the axes XYZ are achieved thanks to position encoders (not visible in this figure) and transmitted to the control unit which can capture the XYZ coordinates of the measuring system at the instant when the part's surface is detected. The orientation of the measuring system, the probe parameters and the approach direction then make it possible to determine the characteristics, including the orientation of the measured surface, and to compute the place of the contact point obtained with the part 200 measured by the tip 154 of the feeler 150. The measuring head can be of the oriented manually or motorized type, respectively, the control unit calculates the position of the contact point from the angular information supplied by the encoders of the orientable head or by a fixed compensation previously measured for a given orientation of the probe.

In the case of a motorized machine, the displacements along the axes XYZ are performed by motors, for example direct current electric motors, according to a displacement program recorded in the control unit, or following real time control by an operator, for example by means of the keyboard 123 or another input device controlling the axes independently.

The CMM of FIG. 1, comprising three linear orthogonal axes according to a bridge structure, is used in the following description. It must however be emphasized that this structure is used only to provide a concrete basis to the embodiments presented but that it does not constitute a limiting or indispensable characteristic of the invention, which can also apply to machines with other axis configurations, in particular with a greater or lower number of linear axes, as well as to or positioning systems having one or several rotation axes or combinations or linear and rotation axes, or to machines in which the positioning is ensured by linear axes that are not orthogonal relative to one another.

The invention can also apply to measuring machines provided with other types of probes, such as for example scanning, optical or laser probes, or probes with induction or capacitive sensors, distance sensors, shape detection sensors, edge detection sensors, contact probes, trigger probes and any kind of variation of physical values for deducing information relating to the position or dimension of the part to be measured. This can also apply to machines combining displacements of the part to be measured and displacements of the measuring sensor, such as for example in CMMs with a mobile or rotating table.

Figure 2:
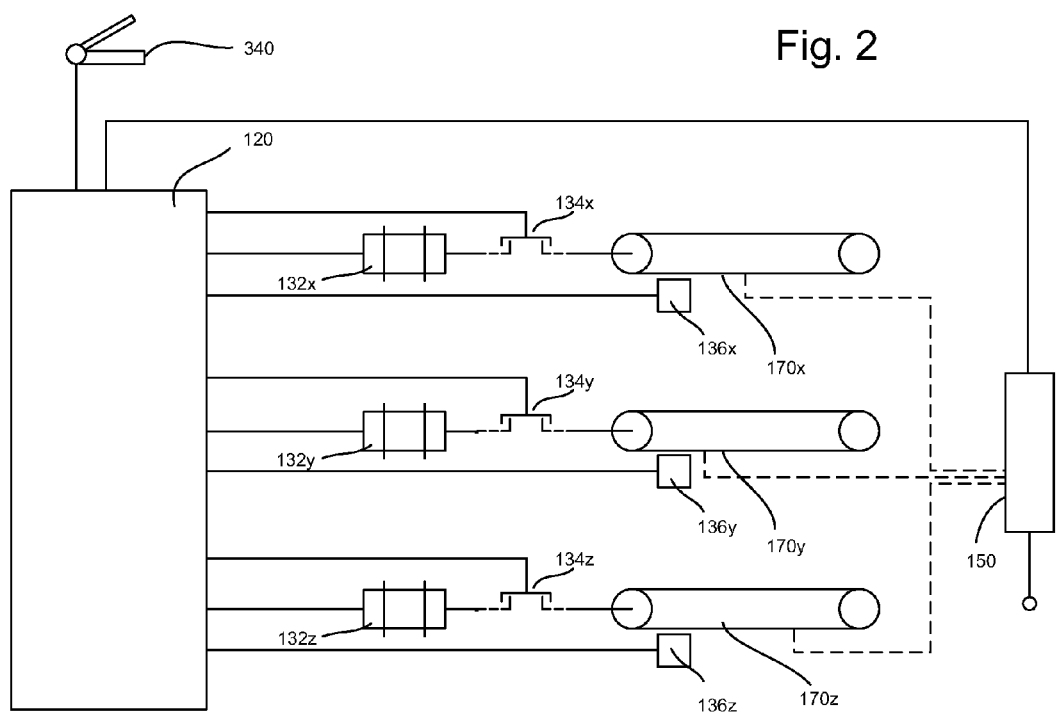
FIG. 2 illustrates diagrammatically the structure of the measuring machine of FIG. 1.

FIG. 2 represents diagrammatically the driving and control systems of a measuring machine according to one aspect of the invention. The measuring probe 150 is displaced along a suitable number of axes, in this example the three axes X, Y, Z, driven by the three driving elements 170$x$, 170$y$, 170$z$ and by their respective motors (also called actuators in the context of this document) 132$x$, 132$y$, 132$z$ controlled by the control unit. The encoders 136$x$, 136$y$, 136$z$ supply the positions of the elements 170$x$, 170$y$, 170$z$ to the control unit. Other elements can supplement event information to the control unit, such as for example protection switches, push-buttons or analogue or trigger sensors informing about a particular state.

It is possible, within the frame of the invention, to use any appropriate system capable of ensuring the translation movement of the driving elements 170$x$, 170$y$, 170$z$, either by conversion of the rotation movement into a linear movement or by linear systems and all possible direct or indirect driving variants they afford. It is for example possible to use flexible semi-rigid transmission elements, for example cables or belts, or also helical connections of the screw-nut type or ball-screws or high-precision racks. One can also use linear motors that directly generate a translation movement, for example linear electric motors or piezoelectric or ultrasound motors.

According to an optional aspect, the system of FIG. 2 includes clutches 134$x$, 134$y$, 134$z$ that enable, in the inactive state, the actuators to be decoupled from the elements 170$x$, 170$y$, 170$z$, thus allowing manual displacements of the positioning and measuring system.

The clutches are controlled by the control unit; they can also be engaged manually by means of switches when the controller does not have the exclusive control over the machine. When the controller is active and does not require operations from the operator, it controls the clutches and does not allow the user to take over during the execution of the automatic measurement program. One could also conceive force or displacement detection systems, for spontaneously disengaging the actuators 132$x$, 132$y$, 132$z$ from the elements 136$x$, 136$y$, 136$z$ when the transmitted torque or force exceed a predetermined threshold, without driving the actuators 132$x$, 132$y$, 132$z$. The operator also has the possibility of actuating the clutches to leave one or several axes free of movement during operations. The operator can also use the movement or force detection to operate a large machine requiring motorized assistance for performing the displacements. The clutches can be activated in different ways, either electrically or mechanically or pneumatically.

Optionally, the inventive CMM has a manual programming mode in which the control unit actuates the clutches 134$x$, 134$y$, 134$z$ to partly or totally decouple the actuators 132$x$, 132$y$ and 132$z$, and allow the measuring system to be manually displaced. The instantaneous position given by the encoders 136$x$, 136$y$, 136$z$ during contact of the tip 154 with a part to be measured makes it possible to calculate and store in a program the information relating to the measurement point and the characteristics of the measurement operation.

The control unit 120 is preferably contained in an enclosure of reduced size so as to be held by the operator, fastened to the reference table 20 of the CMM or placed on an appropriate support. Preferably, it will be detached from the CMM in order to minimize the thermal exchanges between the operator, the measuring machine and the electronic control. It comprises input/output peripheral devices such as for example an LCD screen 320, a keyboard, and can comprise a touch screen, a joystick or another orientation and positioning device, communication interfaces according to the Ethernet, Wi-Fi, USB, RS422 standards or any other suitable interface for example to supply results for later use or to print a measurement report.

Figure 3:
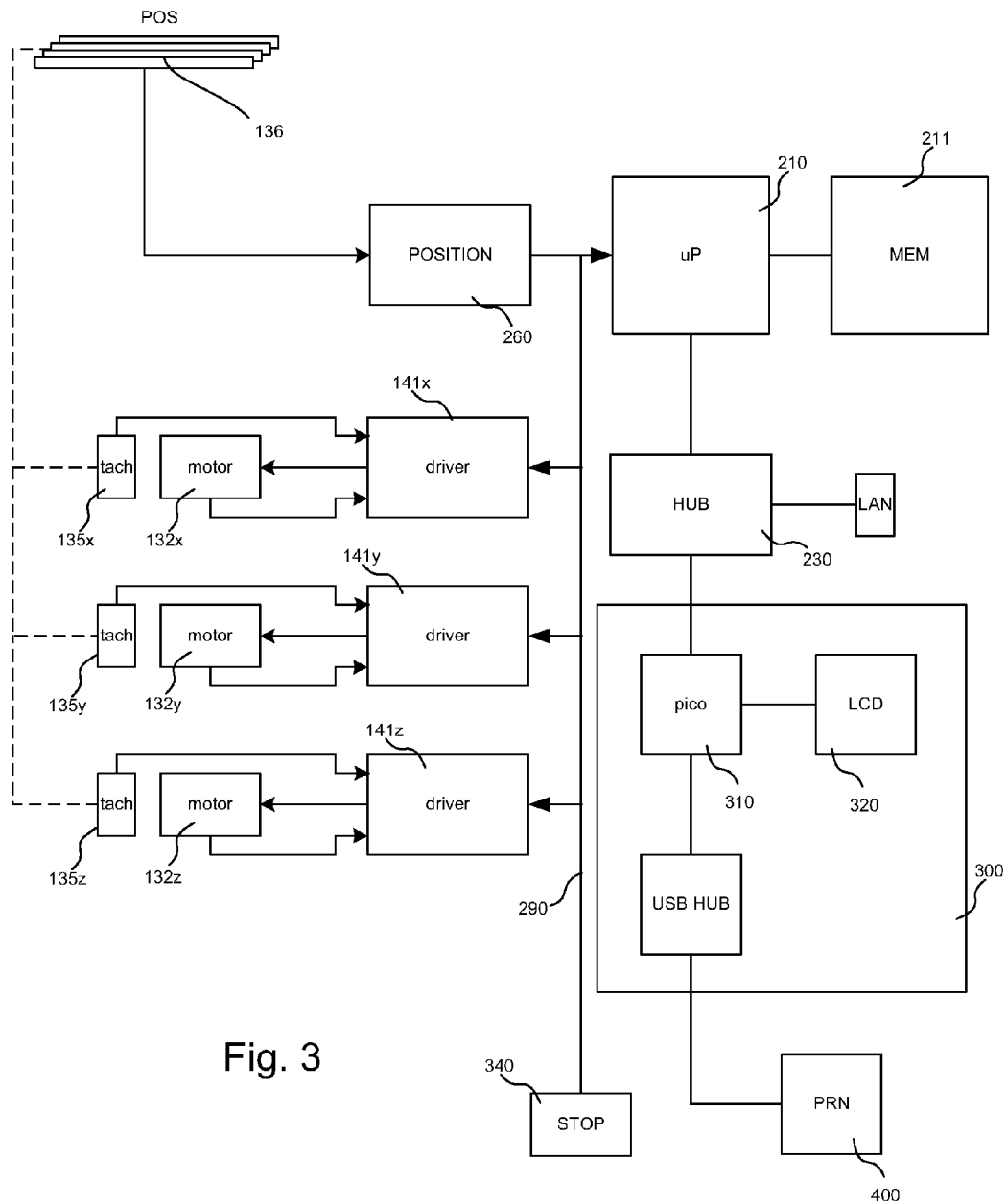
FIG. 3 illustrates diagrammatically the structure of the control unit according to one aspect of the invention.

FIG. 3 illustrates, in a simplified manner, a possible structure of the control unit. The encoders 136 read the position of the axes of the measuring machine. With respect to the linear axes, the encoders 136 can be linear optical rules, or also encoders of different nature capable of providing accurate position information. It is also possible to use angular encoders in the case of rotation axes. The position of the encoders is read by the positioning circuit 260 and stored in counters, accessible through a data bus 290, for example an SPI (Serial Peripheral Interface) or I2C (Inter-Integrated Circuit) bus or any other serial or parallel dedicated or shared bus.

The positioning circuit 260 preferably also comprises at least one interpolation unit for measuring the phase-shifting between the signals between each main pitch and thus enabling the position of the axes of the machine to be determined with an accuracy adapted to the desired resolution. In a typical case, the position of each of the encoders 136 is recorded in an n-bit counter to which is added the fraction of pitch obtained by interpolation, providing an additional m bit resolution to define the position of the system according to each axis. The values of n and m can vary according to the size of the machine, the technology of the ruler and the accuracy required.

It is also conceivable within the frame of this invention to use types of absolute encoders that allow the determination of an absolute position at each instant regardless of the rule length.

The microprocessor 210 can programmed to read the position of the axes of the CMM, to control the actuators 132, to perform the interpolations, to store the determined positions to correct the trajectories of each axis. In the illustrated example, the CMM has three linear axes, actuated by the motors 132x, 132y, 132z, and one or several rotation axes, for example an orientable head, actuated by the motors. As we already mentioned, the invention applies to any machine having several degrees of freedom for measuring a position in a determined space in a repetitive and accurate fashion.

The microprocessor 210 in the frame of this invention is a mono-chip but, in the case of a more complex machine, can also be conceived as an architecture with several chips, making it possible to increase the parallel processing capability, the resolution of the positioning or as an architecture with dedicated tasks specializing the functions of each calculator or of redundancy for error checking. According to a possible variant, the microprocessor 210 could integrate analog-to-digital converters and the positioning circuit or part of it could be implemented by software resources in the microprocessor's program.

In the manual programming mode illustrated here above, the processor 210 generates the necessary instructions to uncouple the coupling devices 134, for example by means of pneumatic clutches, or assists the operator in the displacements, and records the displacements and the positions given by the encoders 136, the passage points and the measurement points, so as to be able to reproduce them again in an identical fashion. The inventive controller can preferably also receive external programs, for example through an Ethernet interface or with USB. The program is recorded in the RAM 211 in the form of a sequence of positions and of trajectories to be travelled at determined speeds and accelerations. The program can also contain calibration or alignment commands, automatic sequences and manual sequences, probe changes, changes in orientation of the probe, combined results, comparative results added during the manual programming and to create measurement reports.

In the automatic measuring mode, the microprocessor 210 takes up again the positions and the previously recorded trajectories and controls the displacement units by means of displacement commands to each of the actuators so that they perform segments of this trajectory in real time. Then, at each segment, the result is compared with the trajectory to be performed and the following segment is adapted according to measured position errors and the desired trajectory, so that during the final approach at the moment of the measurement, the system approaches the surface to be measured relatively to the normal axis of the surface according to a rectilinear trajectory.

Preferably the system of the invention is arranged such that when the probe approaches a measuring point, the system performs a linear rectilinear displacement at constant speed, without acceleration, in order to minimize the dynamic effects that could adversely affect the precision of the measurement.

Figure 4:
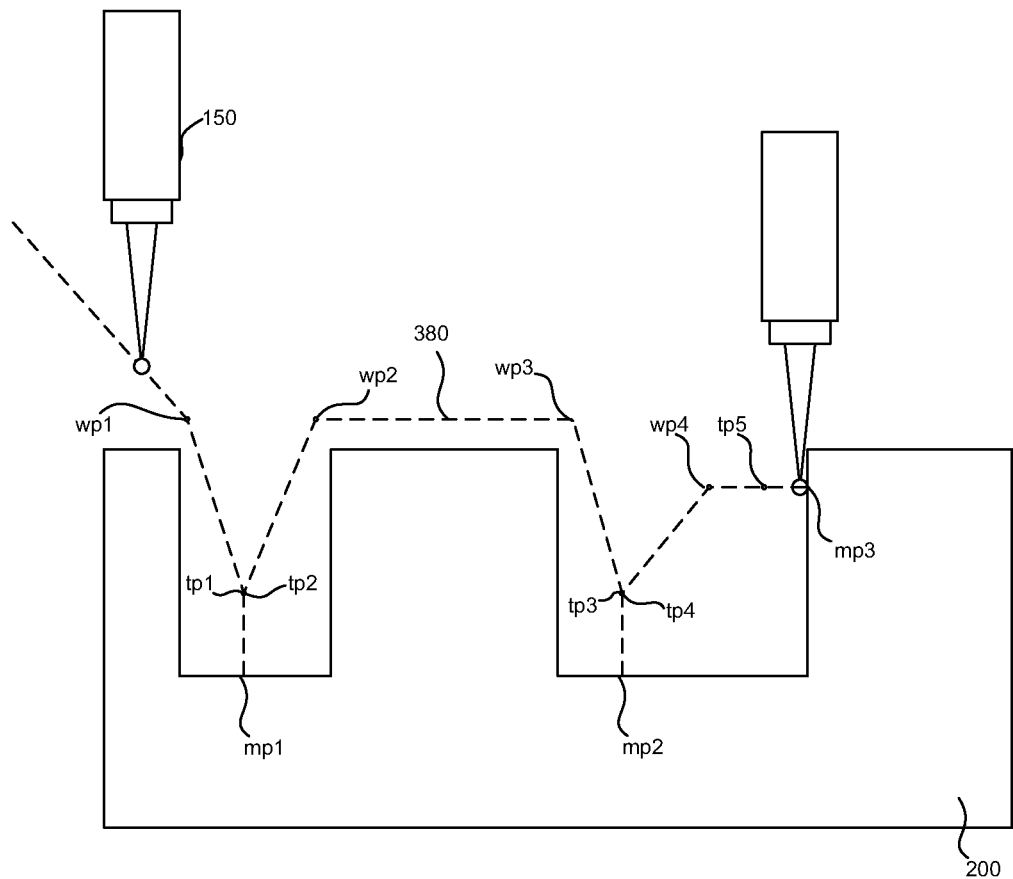
FIG. 4 illustrates an example of use of the measuring machine with the invention.

With reference to FIGS. 4, the system will optionally memorize a crossing point specific to the orientation of the surface to be measured and in particular relative to the manner used for measuring the point. Thus, the journey between the starting point and the crossing point can be made in an optimum manner with the necessary curves to take the accelerations on each axis of the machine into account.

The commands transmitted to the axes can be for example displacement instructions that will be transformed by the axis steering units into rotation and speed information, or be with an acceleration or deceleration that can be programmed according to the load and the number of moving axes for the desired journey. Through these changes of dynamic parametrisation, it is possible to optimize the quick displacements in the case of measurements with low deflections when for example the axis Z is in a high position. But this also applies when an orientable head has a considerable mass, in order to prevent the axis Z from suffering from inertia effects or additional angular torques during accelerations that are too drastic.

Figure 5:
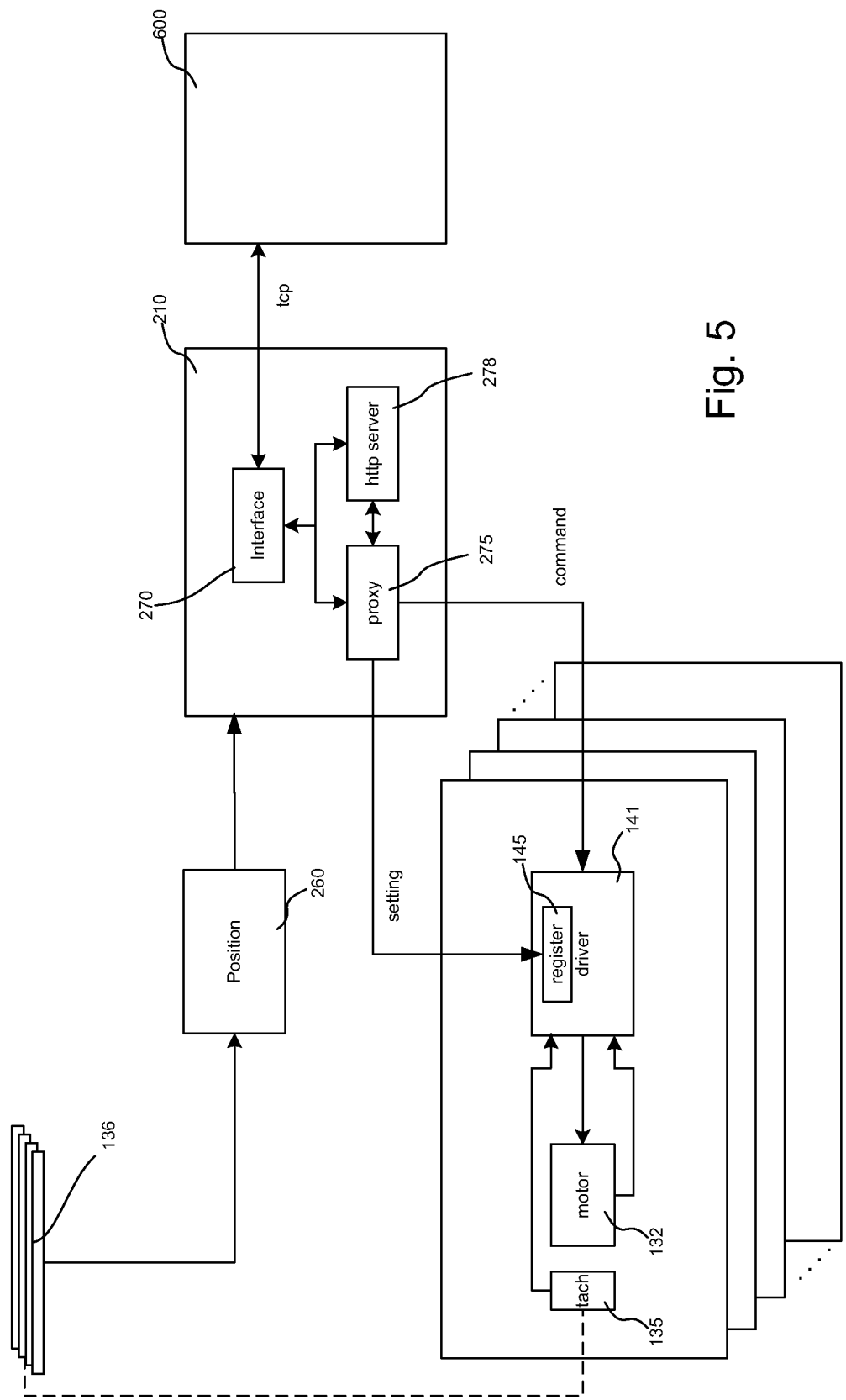
FIG. 5 illustrates schematically the structure of the control unit according to one aspect of the invention.

The actuators 132a-132z are for example electric DC motors coupled with tachometers for regulating the motor's speed whatever the torque. The actuators are individually servo-controlled by the steering circuits by a speed regulation loop. The steering units 141x-141z comprise a control circuit or a control software program, tuned in order to perform the of displacements required by the microprocessor 210, as close as possible to the desired trajectory, with the aid of the tachometers' measurement, and then supplies back to the microprocessor a confirmation of execution and awaits the command for the subsequent segment. This can be achieved for example by a PID (proportional-integral-derivative controller) control loop, or by any suitable control algorithm. The steering units 141, 141x, 141y, 141z include each a memory register 145, shown in FIG. 5 for storing operational parameters of the digital control algorithm, for example the PID coefficients, or any other dynamic state information, and the memory registers are accessible to the microprocessor for modification and tuning, as it will be seen later on.

In one variant embodiment, the system can tune the parameters stored into registers 145 in order to optimize the trajectory precision, dependent on the dynamic properties of the system, and taking into account the mass and inertias of the positioning system and of the attached probe or tool. This dynamic tuning is achieved, for example, by analysing the dynamic response of the system to displacement instructions in real time, in order to compute a dynamic model, whereupon the optimal dynamic parameters for registers 145 can be computed by known methods.

Preferably, the dynamic tuning is carried out by an external supervisor program running on an external device 600 that is connected to the control unit 120 by means of a suitable data interface 270, for example a TCP/IP interface, and acting on the acting steering units 141 by means of a proxy module 275 in the control unit 120 or, preferably, implemented as a software element in the microprocessor unit 210. The external device 600 could be a laptop, or a personal computer, for example, such that the dynamic tuning can use the computing resources and user interface of the laptop.

According this aspect of the invention, the dynamic parameters for regulating the steering circuits can be modified acting on appropriate numeric coefficients. Advantageously, the control parameters can be adapted to different situations, for example to measuring heads 150 of different masses and sizes, in order to achieve for each tool an optimum guiding precision. The parameters can also be adapted by the microprocessor unit according to predefined tables or by known algorithms.

According to one aspect of the invention, illustrated in FIG. 4, the microprocessor 210 is designed for sending commands to the steering circuits 141 so as to send them the trajectories to be travelled and, if necessary, to modify their responses depending on the measurement conditions. The machine is programmed to measure the coordinates of the three points mp1, mp2, mp4 of the part 200 with the contact probe 150, following the programmed trajectory 380. The trajectory 380 comprises the crossing points wp1, wp2, wp3, wp4 and makes it possible to measure the desired points without unexpected collisions between the probe 150 and the part 200 to be measured. The illustrated example only includes rectilinear segments, for the sake of simplification, but it must be understood that the inventive controller can also guide the probe 150 to follow curvilinear paths, for example comprising arcs of circles, helices, polynomial functions or any other optimized curve between the measurement points and the displacement points.

At the beginning of the program, the processor 210 programs the axis-steering units 141x-141z with a first regulation parameterisation seeking to achieve a quick displacement. Then, during the displacement, the processor 210 reads periodically (for example at each millisecond) the coordinates stored in the positioning circuit 260, calculates the instruction positions for the axis-steering units in order to follow the desired path, and transmits them to the axis-steering units the position instructions that are then converted into speed instructions to steer the motors over a determined distance. When the probe reaches the first crossing point wp1, the controller modifies the regulation parameters in an opportunistic fashion to introduce an index reaction only into the measurement axis. The measurement can thus involve several axis-steering units, thus preventing positioning errors lateral to the measurement axis from influencing the direction of the measurement and the approach movement during the measurement phase.

The transition point tp1 marks the beginning of the final approach phase to the measurement point mp1. The processor determines the point tp1 for example on the basis of the distance to the measurement point mp1 and of the approach direction used when the program was stored. When the probe passes through the transition point, the processor sends appropriate instructions to slow the movement to a constant and known speed, and programs the axis-steering units 141x-141z with a second set of regulation parameters seeking to eliminate the accelerations and decelerations, thus preventing movements lateral to the approach vector to the measurement point. At the transition point tp2 (FIG. 4), the program switches from the approach mode to the normal mode. The processor reprograms the regulation parameters and sends appropriate displacement commands to perform the trajectory 380 through the crossing points wp2, wp3. Once the transition point tp3 has been reached, the processor switches again to approach mode, reprograms the regulation parameters, and performs the measurement of the point mp2. The process is repeated for the point mp3 and so on until the end of the measurement program.

According to another optional aspect of the invention, the controller 120 also includes a modular microcomputer 300 that controls the measurement program and performs the higher-level processing of the measured data, manages the user interface, and controls the input-output peripheral devices such as for example the screen 320, a keyboard, a joystick (not illustrated), input-output interfaces of USB, serial or Ethernet type, for example a printer output 400. According to a variant embodiment, the microcomputer module 300 communicates with the microprocessor 210 or with an external computer through an Ethernet bus for example using the TCP protocol according to the I++ or I++DME standard.

The microcomputer can for example be a pico-ITX module or another microcomputer based on an ultra-compact motherboard. Advantageously, these systems can accommodate advanced embedded operational systems, for example Windows CE, Linux or android, thus affording great flexibility and a complete development environment capable of managing standard peripheral devices and of creating systems providing simplified functionalities by comparison with a conventional microcomputer and limited to the possibilities of the embedded application, as the options such as the inputs-outputs are completely defined from the start.

According to another aspect of the invention, the control unit 120 comprises an http server accessible by one or more external units 600 connected to the data interface 270. In this manner, an User's Interface to the control unit can be obtained on the external unit 600, that runs a conventional web browser. This aspect of the invention allows for example the execution of diagnostic tests, programming of the measurement program, calibration, or data collection. Optionally, also the dynamic tuning of the parameters in the registers 145 can communicate with the control unit 210 through the http server 278.

The invention claimed is:

1. Coordinate positioning machine with:
   a measuring head or tool connected to a mobile platform that can be translated according to one or several displacement axes;
   one or several actuators arranged for displacing said measuring probe along said displacement axes;
   one or several encoders encoding the positions of said displacement axes;
   a control unit including independent digital axis-steering units adapted for regulating the speed and/or the position of one of said actuators, wherein the digital axis-steering unit or units include each a memory register for storing operational parameters of the digital axis-steering unit;
   the control unit including a microprocessor unit programmed for:
      reading the position of the displacement axes from the encoders;
      calculating and transmitting displacement instructions to the numeric axis-steering unit or units based on a displacement program;
      setting the operational parameters of the digital axis-steering unit or units by accessing the respective memory register or registers,
   the control unit further including a communication interface and a proxy module arranged to set the operational parameters of the digital axis-steering unit or units in response to data received by the communication interface.

2. The coordinate positioning machine of claim 1, wherein the proxy module is arranged to transmit displacement instruction to the numeric axis steering unit or units in response to data received by the communication interface and/or to transmit the position of the displacement axes to the communication interface.

3. The coordinate positioning machine of claim 1, wherein the control unit comprises an http server.

4. The coordinate positioning machine of claim 1, wherein the proxy module is programmed into the microprocessor unit.

5. The coordinate positioning machine of claim 2, in combination with a regulation unit, programmed to tune the operational parameters stored in the registers of the digital axis-steering unit or units over the communication interface.

6. The combination of claim 5, wherein the regulation unit is arranged to issue displacement instructions to the digital axis-steering unit or units and compute operational parameters to be stored in the registers of the digital axis-steering unit or units dependent on the motion of the displacement axes.

7. The coordinate positioning measuring machine of claim 1, wherein each actuator is connected to a tachometer supplying a speed signal to said numeric axis-steering units, which are adapted for regulating the speed of said actuators depending on said speed signal.

8. The coordinate positioning machine of claim 1, wherein the tool comprises a measuring head capable of measuring coordinates of points on the surface of a workpiece.

9. The coordinate positioning machine of claim 1, wherein said axes include translation axes and rotation axes.

\* \* \* \* \*